W. H. HALLADEY.
AUTOSLEIGH.
APPLICATION FILED JUNE 20, 1910.
1,039,278.
Patented Sept. 24, 1912.
2 SHEETS—SHEET 1.
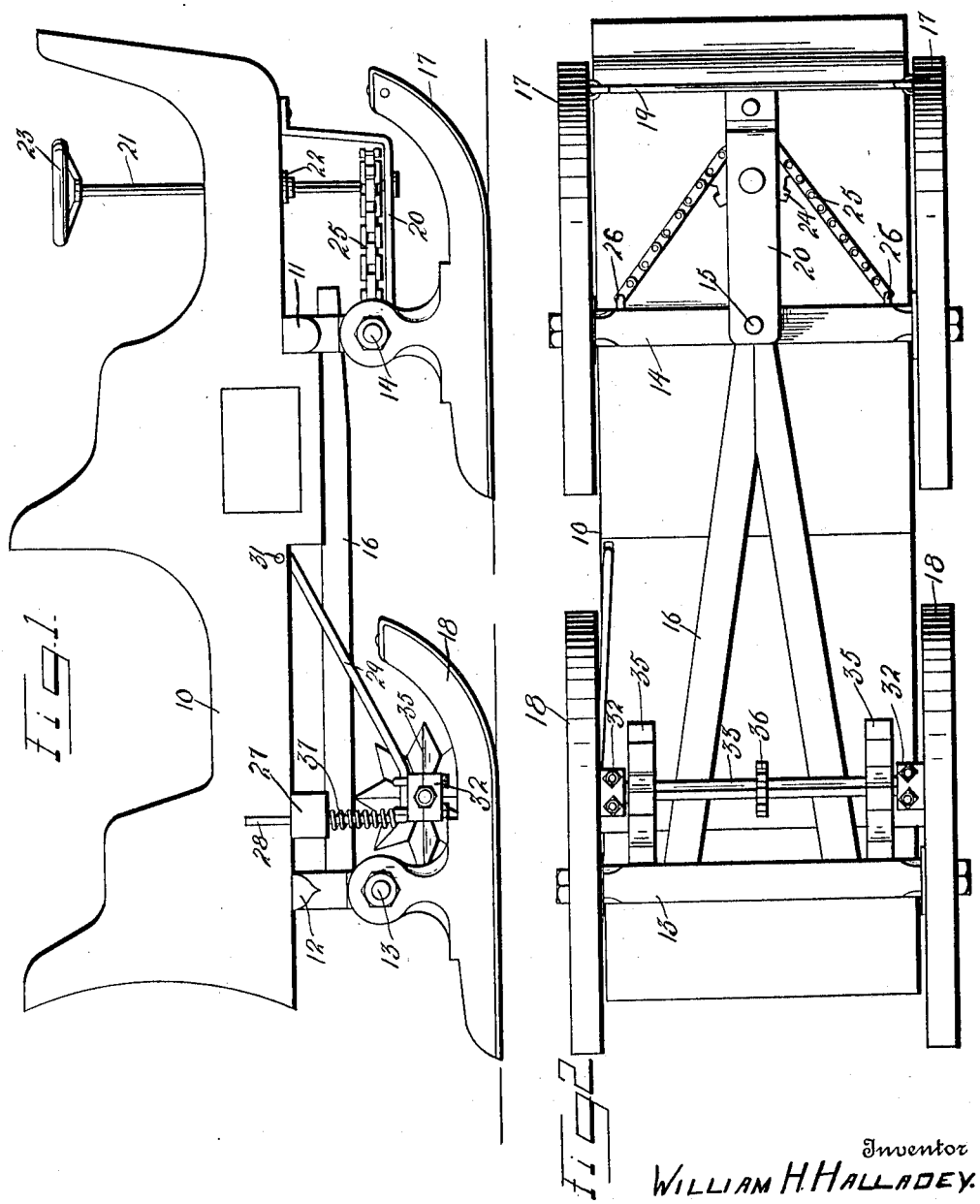
Inventor
WILLIAM H. HALLADEY.

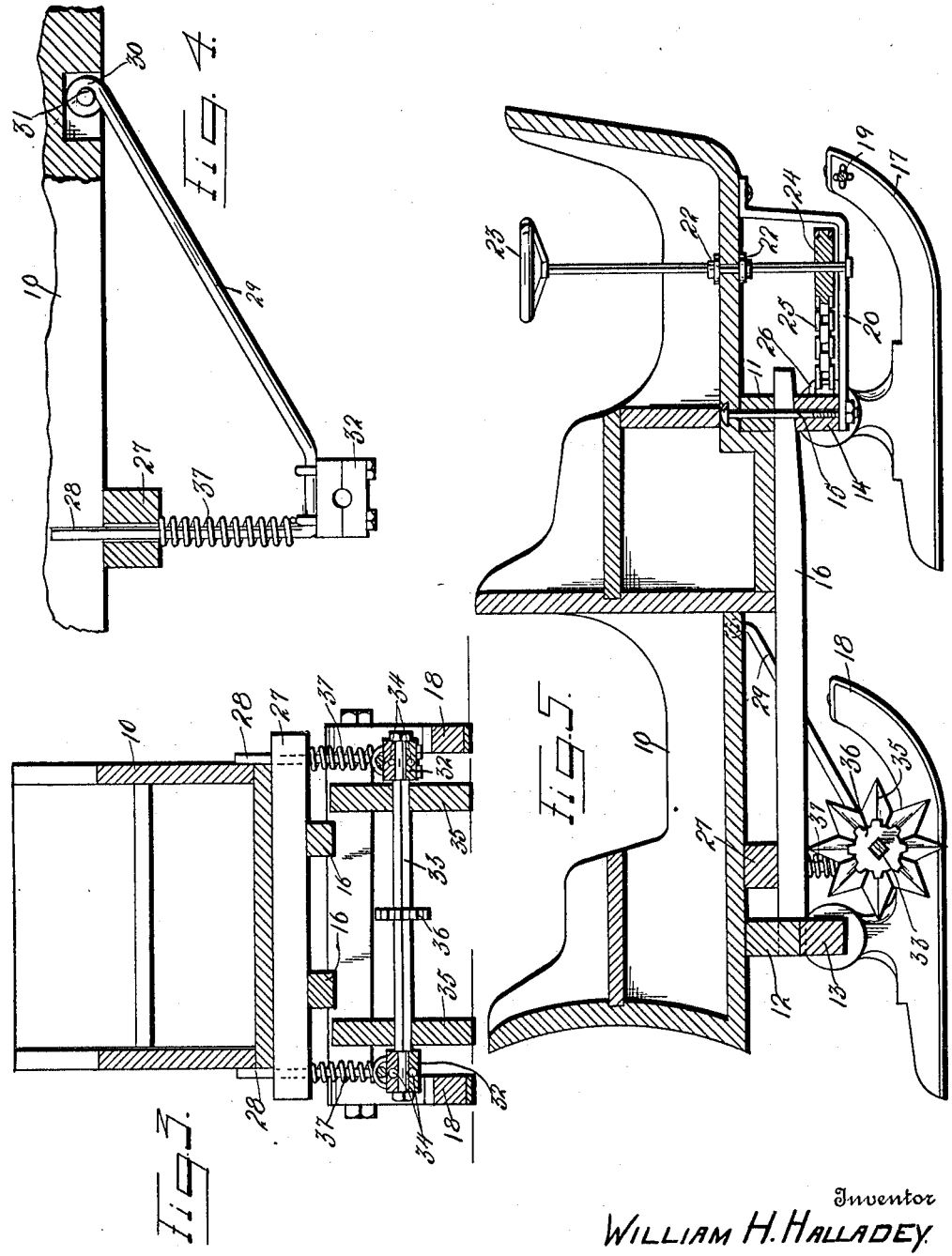

A # UNITED STATES PATENT OFFICE.

WILLIAM H. HALLADEY, OF BEMIDJI, MINNESOTA.

AUTOSLEIGH.

1,039,278. Specification of Letters Patent. Patented Sept. 24, 1912.

Application filed June 20, 1910. Serial No. 567,887.

*To all whom it may concern:*

Be it known that I, WILLIAM H. HALLADEY, a citizen of the United States, residing at Bemidji, in the county of Beltrami, State of Minnesota, have invented certain new and useful Improvements in Autosleighs; and I do hereby declare the following to be a full, clear, and exact description of the invention, such as will enable others skilled in the art to which it appertains to make and use the same.

The invention relates to automobile sleds.

The primary object of the invention is the provision of a sleigh of this character in which the driving wheels are supported in a manner so as to respond to any irregularity of the surface over which the sleigh is being propelled thus overcoming any possibility of the breaking of the driving wheels when the sleigh is in operation.

Another object of the invention is the provision of a sleigh of this character in which the propelling wheels are actuated or driven by a motor carried by the sleigh whereby it may be propelled over ice or snow, the sleigh being under positive control of an operator at all times.

A further object of the invention is the provision of a sleigh in which the front runners are so supported as to be under control of an operator whereby they may be steered in directing the course of travel of the sleigh.

A still further object of the invention is the provision of a sleigh in which the propelling device will ride over uneven surfaces without affecting the movement of the vehicle, said propelling device being automatically adjustable relative to the surface over which the sleigh is traveling.

A still further object of the invention is the provision of a sleigh which is simple in construction, thoroughly reliable and efficient in operation, and inexpensive in manufacture.

With these and other objects in view the invention consists in the construction, combination and arrangement of parts as will be hereinafter more fully described, illustrated in the accompanying drawings, disclosing the preferred form of embodiment of the invention and pointed out in the claim hereunto appended.

In the drawings:—Figure 1 is a side elevation of an automobile sleigh constructed in accordance with the invention. Fig. 2 is a bottom plan view thereof. Fig. 3 is a transverse sectional view of the sleigh. Fig. 4 is a fragmentary enlarged view of the automatically adjustable brackets, a portion of the sleigh body being broken away to disclose the manner of mounting of the said bracket. Fig. 5 is a vertical longitudinal sectional view through the sleigh.

Similar reference characters indicate corresponding parts throughout the several views in the drawings.

Referring to the drawings by numerals 10 designates generally the body of the sleigh which may be of any desirable shape and construction, the body being supported upon front and rear cross hounds 11 and 12, the rear cross hound having connected thereto a stationary axle 13 while the front hound has connected thereto a front turning axle 14 by means of a king bolt 15 and bracing the said hounds are the usual reach beams 16 the latter being connected to the said hounds in any suitable manner.

Journaled upon the axle ends are front and rear runners 17 and 18 the front runners being connected at their curved upturned ends by means of a cross tie rod 19 so as to prevent lateral spreading of the said front runners. Fixed centrally to the bottom of the vehicle body 10 near its front end is an L-shaped bracket 20 the horizontal arm of which is connected to the king bolt 15, the bracket serving as a bearing for the lower end of a vertical steering shaft 21 the same being also journaled in suitable bearings 22 fixed to the bottom of the body of the sleigh. Fixed to the upper end of the steering shaft 21 is the usual hand steering wheel 23 and this shaft also has fixed near its lower end a sprocket wheel 24 over which is trained a sprocket chain 25 the ends thereof being connected near opposite ends of the front turning axle 14 by means of eye members 26 whereby on the turning of the steering shaft the front runners may be turned for the guiding of the sleigh in its travel over ice or snow.

Secured to the bottom of the sleigh body 10 near its rear end between the front and rear hounds is a cross beam 27 the ends thereof being protruded beyond the vertical side walls of the said body and are provided with suitable vertical openings in which slide the vertical guide rods or portions 28 of hangers or brackets 29 the remaining portions being formed at their ends with eyes 30 loosely fitted in suitable recesses in the bottom of the said body 10 and through which are passed pivots 31 fastened within the said body and engaging the eye terminals 30 of the said hangers or brackets for the attachment of the same to the sleigh body.

Suitably clipped to the bracket are split bearings 32 in which is journaled a horizontal driving shaft 33, the bearings 32 supporting suitable bearing walls 34 circumscribing the journal ends of the driving shaft 33 and fixed upon this shaft 33 adjacent to the inner face of the bearings 32 are spurred propelling wheels 35 adapted to penetrate or bite into the icy or snowy surface on the ground for the advancement of the sleigh. This driving shaft 33 also has fixed thereto a sprocket wheel 36 the latter being driven through the medium of a sprocket chain operated by suitable motive power (not shown) stationed upon the vehicle body.

Surrounding the vertical guide portions 28 of the bracket 29 are coiled expansion springs 37 each having one end bearing against the under side of the cross beam 27 and its opposite end bearing against the bight formed at the lower end of the vertical portion of the bracket 29 and by means of these springs the said propelling wheels are maintained in constant contact with the snow or ice surface yet permitting the said wheels to readily rise out of contact with the surface on which the runners rest by reason of irregularity of the surface on which the sleigh is traveling.

As power is transmitted from a suitable motor upon the vehicle body through the medium of a chain connected with the sprocket wheel 36 rotary motion will be imparted to the driving shaft 33 which in turn will transmit it to the propelling wheels for driving the sled in a forward direction. The pivots 31 are capable of detachment so as to permit the brackets to be readily detached from the body so that the said body may be supported by ordinary traction wheels which may be journaled upon the axle ends on the detachment of the runners therefrom.

What is claimed is:—

The combination with an automobile body having a front steering axle and runner and a rear axle and runner; of a cross beam secured beneath the body and projecting beyond the sides thereof, said projecting portions being provided with vertical apertures immediately outwardly of the sides of the body, said sides being provided with recesses forwardly of said cross beam, bracket members comprising single sections of resilient metal bent intermediate of their ends to provide upwardly inclined forward portions having eye terminals disposed in the recesses and horizontal intermediate lower portions terminating in vertical extensions disposed through the apertures in the cross beam, detachable pivots engaged through the eye terminals to pivotally connect the forward ends of the rods to the body, resilient means engaged on the vertical portions of the rods between the cross beam and horizontal portions thereof, bearings suspended from said horizontal portions and a traction wheel carrying drive shafts rotatable in the bearings.

In testimony whereof, I affix my signature, in presence of two witnesses.

WILLIAM H. HALLADEY.

Witnesses:
 GRAHAM M. TORRANCE,
 GEORGE H. BRADT.

---

Copies of this patent may be obtained for five cents each, by addressing the "Commissioner of Patents, Washington, D. C."